Jan. 11, 1966  S. A. PLATT  3,228,315
CAMERA SHUTTER
Filed March 22, 1963  3 Sheets-Sheet 1
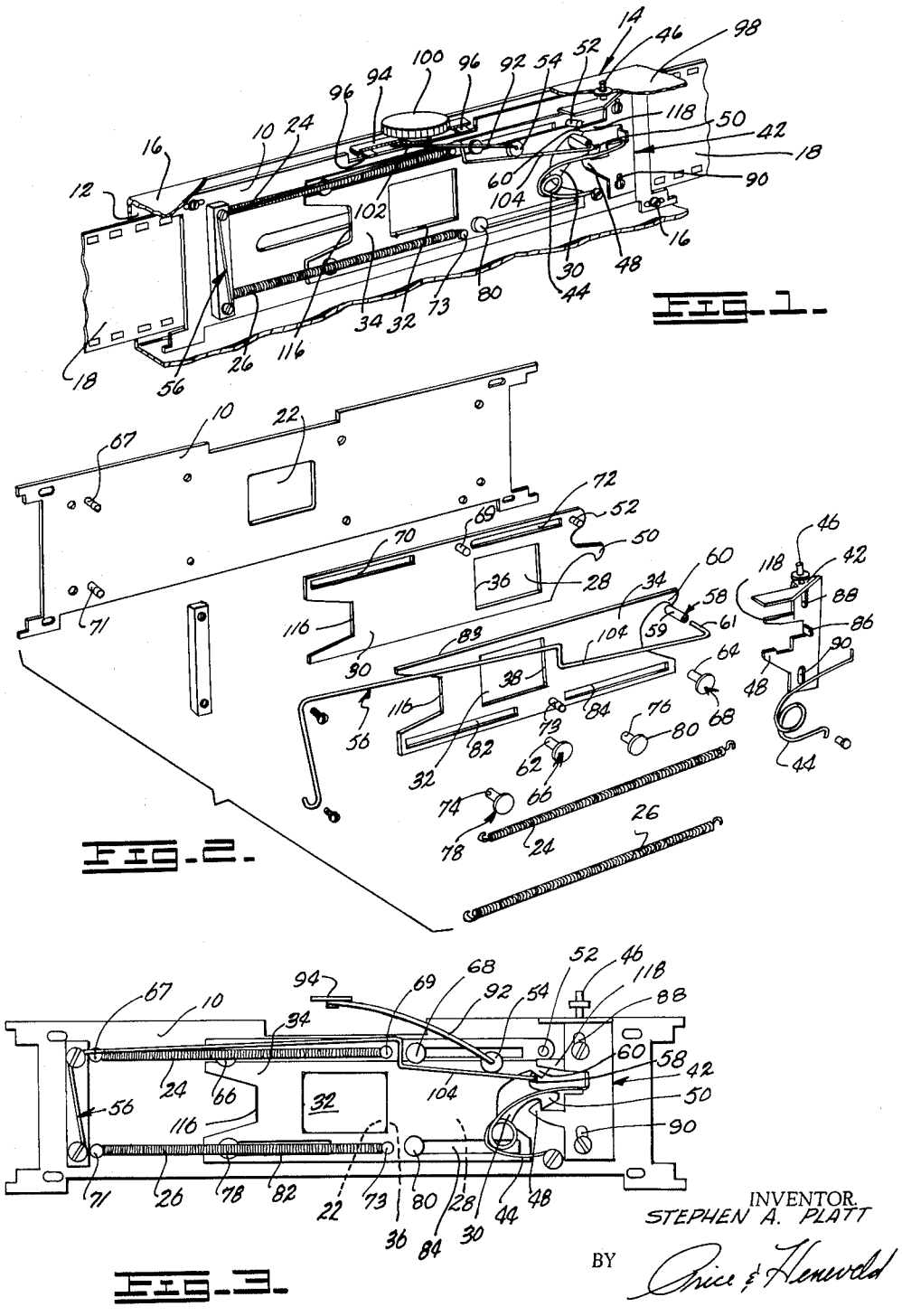
INVENTOR.
STEPHEN A. PLATT
BY
*Price & Henevold*
ATTORNEYS

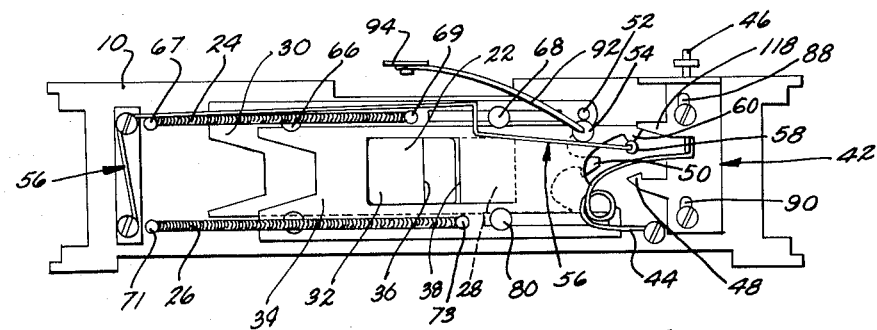
FIG.-4-
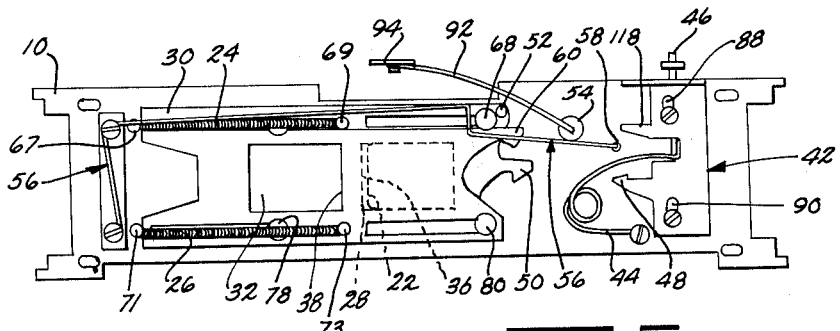
FIG.-5-
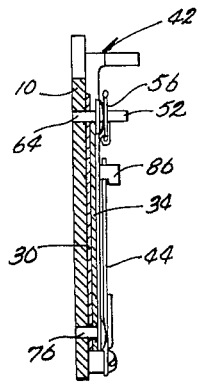
FIG.-6-
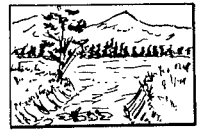
FIG.-7-
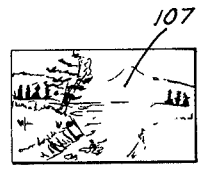
FIG.-8-

Jan. 11, 1966   S. A. PLATT   3,228,315
CAMERA SHUTTER

Filed March 22, 1963   3 Sheets-Sheet 3

INVENTOR.
STEPHEN A. PLATT
BY
ATTORNEYS

United States Patent Office 3,228,315
Patented Jan. 11, 1966

3,228,315
CAMERA SHUTTER
Stephen A. Platt, 1100 Fulton St., Grand Haven, Mich.
Filed Mar. 22, 1963, Ser. No. 267,281
9 Claims. (Cl. 95—55)

This invention relates to shutters for cameras, and more particularly to a shutter mechanism particularly adapted for wide-angle photography on very small sizes of film.

In many industrial as well as recreational applications, it is desirable to take photographs with wide-angle lenses on a small film strip such as sixteen millimeter film. It is a characteristic of wide-angle optical systems that they must operate with very little distance between the last glass element and the film.

A well-known, satisfactory, and economical type of camera shutter is the type in which a pair of apertured blades are drawn at close time intervals across the optical path; the first or leader blade being arranged to open the optical path, and the second or follower blade being arranged to block it immediately thereafter. In order to obtain a constant, presettable time interval between the movements of the two blades, a mechanism is provided by which the motion of the leader blade triggers the motion of the follower blade in a predetermined position of the leader blade. Because of the fact that the leader blade must of necessity exert some force on the triggering mechanism of the follower blade in order to actuate it, a minute hesitation of the leader blade occurs at the moment when it triggers the follower blade. When the shutter is close to the lens, or when the exposure is relatively long, this hesitation is of little consequence. However, when the shutter is positioned away from the lens and very close to the film, and the exposure is relatively short, the hesitation of the leader blade begins to have a severe deleterious effect on the picture quality by producing an unevenly exposed picture such as shown in FIG. 8. For this reason, the twin-blade type of shutter has heretofore been considered unsuitable for high-speed, wide-angle, small-film cameras.

The present invention is concerned with a blade construction and trigger mechanism having special features for reducing the hesitation of the leader blade to a minimum and thus providing a uniformly exposed picture even when the shutter mechanism is located immediately adjacent the film and the exposure is set to the shortest value encountered in ordinary photography.

It is therefore the primary object of this invention to provide a shutter mechanism of the twin-blade type in which the linear velocities of the blades during exposure of the film remain nearly perfectly constant.

It is a further object of this invention to provide a shutter mechanism of the type described in which the trigger mechanism for the follower blade has a substantially negligible mass.

It is another object of this invention to provide a shutter of the type described in which the force necessary to release the follower blade is less for a short exposure setting than for a long exposure setting.

It is still another object of this invention to provide a mechanism of the type described in which the resilient bias which urges the follower blade latch into latching position is less than the inherent resiliency of the biasing element.

These and other objects of the invention will become apparent from the following specification, taken in connection with the accompanying drawings in which:

FIG. 1 is a perspective view, partly broken away, showing the mechanism of this invention in its assembled relationship;

FIG. 2 is an exploded view showing the various parts of the mechanism;

FIG. 3 is a front elevation of the mechanism in the cocked position;

FIG. 4 is a front elevation similar to FIG. 3 but showing the mechanism at the moment of release of the follower blade;

FIG. 5 is an elevation similar to FIG. 3 but showing the mechanism after completion of an exposure;

FIG. 6 is a vertical section along line VI—VI of FIG. 3;

FIG. 7 shows a picture taken with an extremely short exposure using the mechanism of this invention;

FIG. 8 shows the same picture when taken at the same exposure with a conventional two-blade mechanism;

Figure 9:
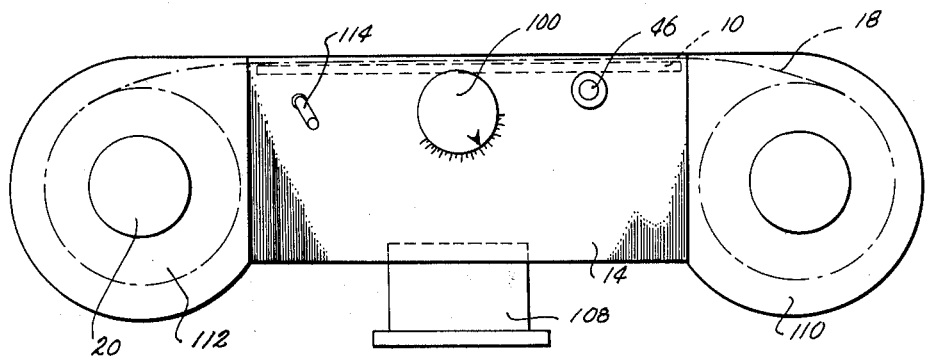
FIG. 9 is a plan view of a camera according to this invention showing the relative arrangement of the objective and mechanism.

Basically, the invention is concerned with maintaining an extremely accurate spacing between the leader and follower blade of a twin-blade shutter mechanism during the entire exposure process. In a twin-blade mechanism, the exposure takes place by drawing a thin transparent slot defined by the blades across a transparent frame behind which the film is located. The leading edge of the slot is formed by the leading edge of the aperture of the leader blade as it moves across the frame, while the trailing edge of the slot is defined by the trailing edge of the aperture of the follower blade as it moves across the frame. In order to obtain a perfectly even exposure of the entire frame, it is necessary that the velocity of both blades be exactly constant and equal throughout the travel of their slot-defining edges across the frame.

This requirement poses two conflicting problems: on the one hand, the shutter blades must be extremely light so that they can be accelerated to full operating speed in a fraction of an inch before beginning their travel across the frame. On the other hand, the lighter the leader blade, the less momentum it has, and consequently the more it is slowed by the force necessary to trigger the follower blade triggering mechanism which determines the width of the slot, and hence the amount of exposure.

In accordance with the invention, the hesitation of the leader blade upon triggering the follower blade is held to a minimum by constructing the trigger mechanism from relatively fine wire and light, lubricous plastic parts, and by counteracting the resiliency of the latch spring by opposing it with the bias of the trigger wheel spring. In addition, the latch spring is pivoted remotely from the latch in such a manner that as the exposure setting is decreased, the lever arm of the force applied by the trigger wheel spring is increased, so that less and less triggering force is required as the exposure is shortened. By this method, the triggering force can be reduced at extremely short exposures to substantially the minimum force required to displace the physical mass of the trigger elements, at the same time, the greater exposure times at which the hesitation of the leader blade is percentagewise much less significant, the greater spring force which biases the latch into latching position makes the mechanism more rugged for normal use.

Referring now to the drawings, a perspective view of the mechanism in its assembled, cocked position is shown in FIG. 1, and an exploded view of the same mechanism is shown in FIG. 2. As best appears from FIG. 1, the mechanism is mounted on a mounting plate 10 which in turn is affixed to the rear wall 12 of a camera case 14 by appropriate fastening means 16. The film 18 is drawn between the rear wall 12 and mounting place 10 by an appropriate winding mechanism such as 20 schematically indicated in FIG. 9.

At its center, the mounting place 10 has an aperture herein referred to as the frame 22. The frame 22 defines the area of film which is to be exposed for a given picture. Exposure is accomplished by causing the springs 24, 26 to draw first the aperture 28 of a leader blade 30 and then the aperture 32 of a follower blade 34 across the frame 22. The leading edge 36 of the leader blade aperture 28 and the trailing edge 38 of the follower blade aperture 32 define between them a transparent slot 40 (FIG. 4) which travels at uniform speed across the frame 22 and successively exposes all portions of film behind the frame 22 from right to left in FIG. 1.

Release of the leader blade 30 is accomplished by moving the release member 42 downwardly against the bias of spring 44 by depressing the release button 46. This causes hook 48 of the release member to become disengaged from hook 50 of the leader blade 30, whereupon the leader blade is free to travel leftward under the bias of spring 24. Release of the follower blade 34 is accomplished when pin 52 of the leader blade 30 strikes and depresses the trigger wheel 54 during its leftward movement. The depressing of trigger wheel 54 in turn causes depressing of wire 56, which moves latch 58 out of engagement with hook 60 of the follower blade 34. The follower blade 34 is thereupon free to move to the left under the bias of spring 26.

Referring now to FIGS. 3 through 6, it will be seen that the leader blade 30 is longitudinally guided by engagement of the shanks 62, 64 of pins 66, 68 with slots 70, 72. The follower blade 34 overlies leader blade 30 and thus prevents any movement of the leader blade 30 away from mounting plate 10.

The follower blade 34, in turn, is guided by engagement of the shanks 74, 76 of pins 78, 80 with slots 82, 84. The upper edge 83 of follower blade 34 is held against movement away from the mounting plate 10 by sliding engagement with the underside of the heads of pins 66, 68. It will be appreciated that the spring 24 extending between pins 67 and 69 is substantially coaxial with the slots 70, 72, and that likewise, spring 26 extending between pins 71 and 73 is substantially coaxial with slots 82, 84. The consequent exertion of bias coaxially with the slots eliminates any binding of the guide means during the movement of the blades 30 and 34. For a like reason, the generally coaxial arrangement (FIG. 3) of release button 46, spring shoulder 86, and slots 88, 90 of the trip member 42 prevent any binding during the actuation of the trip member.

Figure 10:
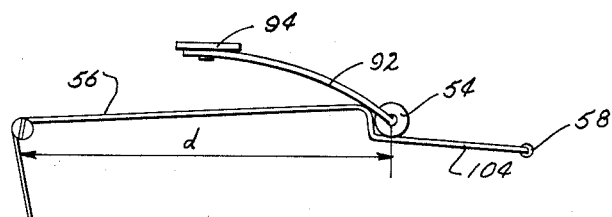
FIG. 10 is a fragmentary view showing the exposure timing mechanism in a long-exposure position.
Figure 11:
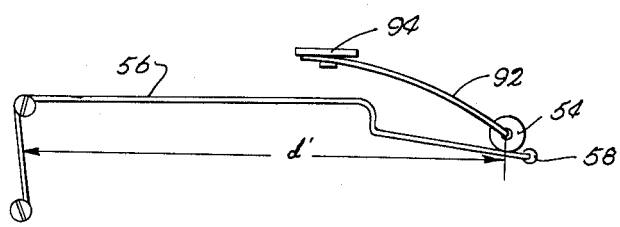
FIG. 11 is a view similar to FIG. 10 but showing the same mechanism in a short-exposure position.

Referring now to FIGS. 1, 10 and 11, it will be seen that the trigger wheel 54 is supported by a spring wire 92 which is attached to a rack 94 at its other end. The rack 94 is supported for longitudinal movement in brackets 96 which may be affixed to the top wall 98 of the camera case 14. Mounted on the outside of the top wall 98 is the exposure control 100 which may cooperate with a pinion 102 to move the rack 94.

As will be more clearly seen from FIGS. 10 and 11, the exposure time is adjusted by moving the rack 94 so as to roll the trigger wheel 54 along the end portion 104 of the latch wire 56. The farther the trigger wheel 54 is moved to the right in FIGS. 10 and 11, the sooner in its movement will the pin 52 trip the latch 58, and the narrower the slots 40 will be.

It will be noted from FIGS. 10 and 11 that the shorter the time setting, the longer the distance $d$, and consequently the greater the lever arm applied by trigger wheel 54 to the latch wire 56. Consequently, it takes less force to trip the latch the shorter the time setting. This is important for the following reason:

As has previously been mentioned herein, the blades 30, 34 must have very low mass in order to accelerate to constant speed within the very short distance between the slot-defining edges 36, 38 of the blade apertures 28, 32 and the right-hand edge 106 of the frame 22. In view of the lightness of the blades 30, 34, however, the work consumed in moving the trigger wheel 54 and latch 58 to release follower blade 34 has a slight decelerating effect on the leader blade 30. Since any speed change of either blade from their predetermined traveling speed alters the slot width, such a change registers on the photograph as an altered or uneven exposure such as the pale streak 107 in FIG. 8. The narrower the slot, the shorter the exposure time; consequently, the photographic effect of any variance multiplies with increased shutter speed because it represents an increasingly greater percentage of the slot width.

In order to obtain an evenly exposed picture as shown in FIG. 7 even at extremely short exposures, the mass of the trigger mechanism has been reduced to a minimum according to the invention by using thin, resilient wires 56, 92 to support and bias the parts of the trigger mechanism, and by manufacturing the trigger wheel 54 and latch 58 of tiny, lightweight, lubricous plastic rollers which are substantially friction-free and have extremely little mass.

It will be particularly noted that latch 58 consists of a small diameter nylon roller 59 (FIG. 2) which is freely rotatable on the end portion 61 of wire 56. The lubricous nature of roller 59 and its free rotatability enable it to roll out of engagement with hook 60 with a minimum of resistance. This arrangement contributes substantially to the lessening of the triggering force required in the mechanism of this invention.

In addition, even the small latching force of latch 58 is further cancelled to near zero by increasing the counter-bias moment of wire 92 as the constant-bias wire 92 is moved to the right for shorter exposures; i.e. the higher the shutter speed, and consequently the narrower the slot, the less force is required from leader blade 30 to release the follower blade 34.

At longer exposures (on the order of 1/50 of a second or more) the slot width is great enough so that the triggering deceleration is not a significant factor even though the shutter blades and film are practically coplanar.

FIG. 9 shows, in somewhat diagrammatic form, the general nature of the camera in which the shutter mechanism of this invention finds its application. The case 14 has a lens 108 at the front and the film 18 at the rear. The mounting plate 10 with its shutter mechanism is as far as possible from the lens and as close as possible to the film, an arrangement made necessary by the requirements of wide-angle photography on narrow film strips. The film may be wound out of a magazine 110 and into a magazine 112 by winding knob 20. A cocking mechanism 114 of well-known construction (not shown in detail) may be provided to engage the edges 116 of the blades 30, 34 to push them back into the cocked position after a picture has been taken.

As best appears from FIGS. 3 through 5, the trip member 42 of this invention is made in one piece and can serve to release both blades at different levels of its travel. Normally, the release button 46 would be provided with an interlock (not shown) to prevent depressing the trip member 42 far enough for the arm 118 to push latch 58 out of engagement with hook 60. However, if the exposure control is set to time exposure, or if an electric release is used, the interlock may be removed, whereupon a depression of the release button 46 will result first in the release of the leader blade 30 and further depression of the button 46 will then result in a release of the follower blade 34. A desired time exposure can thus be obtained by depressing the release button very gently until a first click indicates the release of leader blade 30 and the beginning of time exposure, and then depressing it all the way at the end of the desired time, whereupon the release of follower blade 34 ends the time exposure.

It will be noted that the aperture 32 of the follower blade 34 is somewhat larger than the frame 22. The reason for this is that when a time exposure is desired, no part of the frame 22 is obscured by the follower blade 34 while the time exposure takes place. On the other hand, the trailing edge 38 of the follower blade aperture is sufficiently far to the right of the right-hand edge of frame 22 to permit the follower blade 34 to accelerate to full speed before the trailing edge 38 reaches the frame 22.

It will also be observed from FIGS. 2 through 5 that the guide pins 66, 68, 78 and 80 straddle the frame 22. In this manner, the mechanism can be kept very short in the longitudinal direction and the size of the camera can thus be kept within reasonable limits without sacrificing any of the efficiency of the mechanism.

It will be seen that the present invention provides a highly efficient twin-blade shutter which is capable of providing a uniform exposure of the film even at extremely short exposure periods and even though it is positioned immediately next to the film strip 18 remote from the lens. Obviously, the invention can be carried out in many different ways of which the embodiment shown is merely illustrative. I therefore do not desire to be limited by the embodiment shown and described herein, but only by the scope of the following claims.

I claim:

1. In a camera shutter having a resiliently biased leader blade releasable by an operating mechanism and a resiliently biased follower blade releasable by the leader blade at a predeterminable point in its motion, the improvement comprising: latch means for holding said follower blade in cocked position; trigger means; means biasing said trigger means into engagement with said latch means; actuating means carried by said leader blade and movable therewith; said trigger means being in the path of movement of said actuating means with movement of said leader blade to allow engagement therebetween; and said actuating means cooperating with said trigger means with engagement therewith to release said latch means when said leader blade is at said predeterminable point; and said trigger means being mounted on a shiftable biasing element that is adjustably movable with respect to said latch means to vary the bias resistance to be overcome with release of said latch means.

2. In a camera shutter having a resiliently biased leader blade releasable by an operating mechanism and a resiliently biased follower blade releasable by the leader blade at a predeterminable point in its motion, the improvement comprising: a releasable latch for holding said follower blade in cocked position; a first resilient wire secured to said camera at a point remote from said latch; said latch being secured to said wire for movement therewith; said wire biasing said latch into latching position; a trigger member movable along said first wire; a second resilient wire supporting said trigger member and biasing it into engagement with said first wire; and actuating means carried by said leader blade and positioned to strike said trigger member when said leader blade is at said predeterminable point; said trigger member when struck by said actuating means being pushed thereby against said first wire with sufficient force to overcome the bias of said first wire and move said latch out of latching position.

3. In a camera shutter release mechanism of the type having sequentially released leader and follower shutter blades, the improvement comprising: follower blade latching means; said latching means being resiliently biased about a fixed pivot into latching position; trigger means actuatable by said leader blade for moving said latching means out of latching position; means resiliently biasing said trigger means against said latching means with a substantially constant bias to partially counteract the bias of said latching means at all times; said trigger means being movable along said latching means to vary the interval between the sequential release of said shutter blades; the point of engagement between said trigger means and said latching means being moved farther from said pivot as said interval is shortened.

4. The combination in claim 3 wherein said means resiliently biasing said trigger means in an elongated spring wire movable as a unit with said trigger means to change said point of engagement.

5. In a camera shutter having a resiliently biased leader blade having a latch means releasable by an operating mechanism and a resiliently biased follower blade having a latch means releasable by the leader blade at a predeterminable point in its motion, the improvement comprising: said operating mechanism including a movable resiliently biased trip member having means for releasing said latch means of said leader blade when said trip member is moved a predetermined distance against its bias; said trip member further having means for releasing said latch means of said follower blade when said trip member is moved a predetermined additional distance against its bias.

6. In a camera shutter having a resiliently biased leader blade releasable by an operating mechanism and a resiliently biased follower blade releasable by the leader blade at a predeterminable point in its motion, the improvement comprising: latch means for holding said follower blade in cocked position; and trigger means actuated by said leader blade for releasing said latch means, said latch means comprising an elongated spring wire fixed at one end and having at the other end a lubricous, rotatably mounted latching element adapted to roll out of latching engagement with said follower blade and an elongated spring wire with a trigger element mounted thereon and engaging said latch wire with adjustable positioning with respect thereto.

7. In a camera shutter release mechanism of the type having sequentially released leader and follower shutter blades, the improvement comprising: follower blade latching means; said latching means including an elongated spring wire mounted on one end and having a latch element on the other end operably engaged with a latch element on said follower blade; said latching means being resiliently biased by said spring wire about a fixed pivot into latching position; trigger means actuatable by said leader blade for moving said latching means out of latching position; means resiliently biasing said trigger means against said latching means with a substantially constant bias to partially counteract the bias of said latching means at all times; said trigger means being movable along said spring wire and with respect to said fixed pivot to vary the force necessary to overcome the bias of said spring wire to release said latching means to vary the interval between the sequential release of said shutter blades; the point of engagement between said trigger means and said latching means being moved farther from said pivot as said interval is shortened.

8. In a camera shutter having a resiliently biased leader blade releasable by an operating mechanism and a resiliently biased follower blade releasable by the leader blade at a predeterminable point in its motion, the improvement comprising: fixed mounting means defining an image-transmitting frame; said follower blade having an image-transmitting aperture formed therein and being arranged to move along said mounting means so as to draw the trailing edge of its aperture across said frame; said blade aperture being larger than said frame and positioned so that its trailing edge is longitudinally spaced from said frame when said follower blade is cocked; said operating mechanism including a movable resiliently biased trip member having means for releasing said latch means of said leader blade when said trip member is moved a pedetermined distance against its bias; and said trip member further having means for releasing said latch means of said follower blade when said trip member is moved a predetermined additional distance against its bias; a releasable latch for holding said follower blade in cocked position; a first resilient wire secured to said camera at a point remote from said latch; said latch being secured to said wire for movement therewith; said wire biasing said latch into latching position; a trigger member movable along said first wire; a second resilient wire supporting said trigger member and biasing it into engagement with said first wire; and actuating means carried by said leader blade and positioned to strike said trigger member when said leader blade is at said predeterminable point; said trigger member when struck by said actuating means being pushed thereby against said first wire with sufficient force to overcome the bias of said first wire and move said latch out of latching position.

9. In a camera shutter having a resiliently biased leader blade releasable by an operating mechanism and a resiliently biased follower blade releasable by the leader blade at a predeterminable point in its motion, the improvement comprising: latch means for holding said follower blade in cocked position; trigger means; means biasing said trigger means into engagement with said latch means; actuating means carried by said leader blade and movable therewith; said trigger means being in the path of movement of said actuating means with movement of said leader blade to allow engagement therebetween; and said actuating means cooperating with said trigger means with engagement therewith to release said latch means when said leader blade is at said predeterminable point; said trigger means and latch means being made of lubricous material to minimize friction between said actuating means, and between said latch means and said follower blade; and said trigger means being mounted on a shiftable biasing element that is adjustably movable with respect to latch means to vary the bias resistance to be overcome with release of said latch means.

References Cited by the Examiner

UNITED STATES PATENTS

| | | | |
|---|---|---|---|
| 2,068,911 | 1/1937 | Goldhammer | 95—55 |
| 2,269,400 | 1/1942 | Steiner | 95—63 |
| 2,423,706 | 7/1947 | Hutchison | 95—60 |
| 2,572,229 | 10/1951 | Willcox | 95—56 |
| 3,082,673 | 3/1963 | Takahama | 95—55 |

JOHN M. HORAN, *Primary Examiner.*

NORTON ANSHER, *Examiner.*